US007822137B2

(12) United States Patent
Judd et al.

(10) Patent No.: US 7,822,137 B2
(45) Date of Patent: Oct. 26, 2010

(54) SYSTEM AND METHOD FOR SYMBOL RATE ESTIMATION USING VECTOR VELOCITY

(75) Inventors: Darrell Ray Judd, Rockwall, TX (US); Joshua Douglas Talbert, Garland, TX (US); Bruce Oliver Moses, Rowlett, TX (US)

(73) Assignee: L3 Communications Integrated Systems, L.P., Greenville, TX (US)

( * ) Notice: Subject to any disclaimer, the term of this patent is extended or adjusted under 35 U.S.C. 154(b) by 854 days.

(21) Appl. No.: 11/552,570

(22) Filed: Oct. 25, 2006

(65) Prior Publication Data

US 2008/0101480 A1    May 1, 2008

(51) Int. Cl.
H04L 27/28    (2006.01)
(52) U.S. Cl. .................................................... 375/262
(58) Field of Classification Search ......... 375/259–262, 375/316, 340
See application file for complete search history.

(56) References Cited

U.S. PATENT DOCUMENTS

| | | | |
|---|---|---|---|
| 4,211,996 A | | 7/1980 | Nakamura |
| 4,837,786 A | | 6/1989 | Gurantz et al. |
| 5,119,396 A | | 6/1992 | Snderford, Jr. |
| 5,588,026 A | | 12/1996 | Ishikawa et al. |
| 5,847,622 A | | 12/1998 | Chen |
| 6,141,378 A | * | 10/2000 | d'Oreye de Lantremange .. 375/232 |
| 6,163,230 A | | 12/2000 | Lapierre et al. |
| 6,218,896 B1 | * | 4/2001 | Becker et al. ............... 329/304 |
| 6,658,076 B1 | | 12/2003 | Hayata |
| 6,690,746 B1 | | 2/2004 | Sills et al. |
| 6,934,327 B1 | | 8/2005 | Whited et al. |
| 7,054,382 B2 | | 5/2006 | Lee |
| 7,095,274 B2 | | 8/2006 | Lopez Villegas et al. |
| 7,106,804 B2 | | 9/2006 | Falkenberg |

OTHER PUBLICATIONS

Embedded.com; Simon Sirin; Jan. 15, 2004; A DSP Algorithm for Frequency Analysis.

* cited by examiner

Primary Examiner—Kevin M Burd
(74) Attorney, Agent, or Firm—Hovey Williams LLP

(57) ABSTRACT

A system and method for symbol rate estimation using vector velocity that does not require any prior knowledge of the signal's structure and is accurate in the presence of frequency offset and noise. An input signal is converted to a symbol constellation path signal, and a velocity signal representing a velocity of the symbol constellation path signal is generated. A first frequency spectrum of the velocity signal is generated by performing a Fast Fourier transform on the velocity signal, and a maximum peak value of the first frequency spectrum, a first bin below the maximum peak value, and a second bin above the maximum peak value are identified. A Chirp-Z transform is performed on the velocity signal using the first bin and the second bin as coefficients, wherein performing the Chirp-Z transform generates a second frequency spectrum including only frequencies within the range of the first bin and the second bin, and wherein the second frequency spectrum presents a higher resolution than the first frequency spectrum. A maximum peak value of the second frequency spectrum is identified, wherein the maximum peak value of the second frequency spectrum corresponds to the symbol rate of the input signal.

32 Claims, 9 Drawing Sheets

SYSTEM AND METHOD FOR SYMBOL RATE ESTIMATION USING VECTOR VELOCITY

BACKGROUND OF THE INVENTION

1. Field of the Invention

Embodiments of the present invention relate to signal processing. More particularly, embodiments of the invention involve a system and method for estimating a symbol rate of a signal that does not require prior knowledge of the signal's structure and is accurate in the presence of frequency offset and noise.

2. Description of Prior Art

Signal modulation is the process of encoding a signal with information—such as voice, data, or an image—on a carrier signal, and demodulation is the process of recovering the information from the carrier signal at a signal receiver. Various modulation schemes are known, including amplitude modulation, frequency modulation, and phase modulation. In each modulation scheme, a given state of the carrier signal representing one or more bits of data is commonly referred to as a "symbol."

By way of example, phase modulation, commonly referred to as phase shift keying (PSK) in digital terminology, involves encoding information on the carrier signal by changing the phase of the signal. Each phase possibility is a symbol. For example, binary phase shift keying uses two symbols, each presenting one bit of data, and quadrature phase shift keying uses four symbols, each presenting two bits of data.

It is often desirable to determine a symbol rate of a signal, or the frequency at which symbols are transmitted in the signal. It may be desirable to determine a symbol rate, for example, to characterize an unknown signal detected in a surveillance situation.

Known methods of symbol rate estimation include the "Non-data Aided Maximum Likelihood Based" algorithm as well as the "Oerder and Meyr" algorithm. Unfortunately, these methods suffer from various problems and limitations. For example, such methods require the user to know certain parameters of the signal to be analyzed, such as the shape of signal pulses. Thus, in situations where very little or nothing is known about the signal to be analyzed, existing methods of symbol rate estimation are of no use. Furthermore, the presence of signal noise and frequency offset can impede symbol rate estimation using the known techniques.

Accordingly, there is a need for an improved aircraft engine thrust reverser that does not suffer from the problems and limitations of the prior art.

SUMMARY OF THE INVENTION

Embodiments of the present invention provide an improved system and method of estimating a symbol rate of a symbol that does not suffer from the problems and limitations of the prior art. Particularly, embodiments of the present invention provide a system and method for estimating a symbol rate of a signal that does not require any prior knowledge of the signal's structure and is accurate in the presence of frequency offset and noise.

In a first embodiment, the invention is a computer program for enabling a computer to estimate a symbol rate of a signal, wherein at least a portion of the program is stored on a computer-usable medium. The computer program comprises a code segment for mapping an input signal to a symbol constellation path, a code segment for generating a velocity signal representing a velocity of the signal on the symbol constellation path, a code segment for determining a frequency spectrum of the velocity signal, and a code segment for identifying a maximum peak value of the frequency spectrum.

In a second embodiment, the computer program comprises various code segments for enabling a computer to estimate a symbol rate of a signal. A first code segment converts a plurality of input signal sample values to a plurality of symbol constellation path values. A second code segment generates a velocity signal comprising a plurality of velocity values, wherein each velocity value represents a separation between a first of the plurality of symbol constellation path values and a second of the plurality of symbol constellation path values.

A third code segment determines a first frequency spectrum of the velocity signal by performing a Fast Fourier transform on the velocity signal. A fourth code segment identifies a maximum peak value of the first frequency spectrum, a first bin below the maximum peak value, and a second bin above the maximum peak value. A fifth code segment performs a Chirp-Z transform on the velocity signal using the first bin and the second bin as coefficients, wherein performing the Chirp-Z transform generates a second frequency spectrum including only frequencies within the range of the first bin and the second bin, and wherein the second frequency spectrum presents a higher resolution than the first frequency spectrum. A sixth code segment for identifying a maximum peak value of the second frequency spectrum.

A third embodiment of the invention is a method of estimating a symbol rate of a signal. The method comprises mapping an input signal to a symbol constellation path, generating a velocity signal representing a velocity of the symbol constellation path, determining a frequency spectrum of the velocity signal, and identifying a maximum peak value of the frequency spectrum.

According to a fourth embodiment, the method comprises converting a plurality of input signal sample values to a plurality of symbol constellation path values and generating a velocity signal comprising a plurality of velocity values, wherein each velocity value represents a separation between a first of the plurality of symbol constellation path values and a second of the plurality of symbol constellation path values.

A first frequency spectrum of the velocity signal is determined by performing a Fast Fourier transform on the velocity signal, and a maximum peak value of the first frequency spectrum, a first bin below the maximum peak value, and a second bin above the maximum peak value are identified. A Chirp-Z transform is performed on the velocity signal using the first bin and the second bin as coefficients, wherein performing the Chirp-Z transform generates a second frequency spectrum including only frequencies within the range of the first bin and the second bin, wherein the second frequency spectrum presents a higher resolution than the first frequency spectrum. Finally, a maximum peak value of the second frequency spectrum is identified.

A fifth embodiment of the invention is a circuit for estimating a symbol rate of a signal. The circuit comprises a circuit element for mapping an input signal to a symbol constellation path, a circuit element for generating a velocity signal representing a velocity of the symbol constellation path, a circuit element for determining a frequency spectrum of the velocity signal, and a circuit element for identifying a maximum peak value of the frequency spectrum.

According to a sixth embodiment, the circuit comprises various circuit elements for estimating a symbol rate of a signal. A first circuit element converts a plurality of input signal sample values to a plurality of symbol constellation path values, and a second circuit element generates a velocity signal comprising a plurality of velocity values, wherein each velocity value represents a separation between a first of the plurality of symbol constellation path values and a second of the plurality of symbol constellation path values.

A third a circuit element determines a first frequency spectrum of the velocity signal by performing a Fast Fourier transform on the velocity signal, and a fourth circuit element identifies a maximum peak value of the first frequency spectrum, a first bin below the maximum peak value, and a second bin above the maximum peak value. A fifth circuit element performs a Chirp-Z transform on the velocity signal using the first bin and the second bin as coefficients, wherein performing the Chirp-Z transform generates a second frequency spectrum including only frequencies within the range of the first bin and the second bin, wherein the second frequency spectrum presents a higher resolution than the first frequency spectrum. A sixth circuit element identifies a maximum peak value of the second frequency spectrum.

These and other important aspects of the present invention are described more fully in the detailed description below.

BRIEF DESCRIPTION OF THE DRAWINGS

Preferred embodiments of the present invention are described in detail below with reference to the attached drawing figures, wherein.

DETAILED DESCRIPTION

Figure 1:
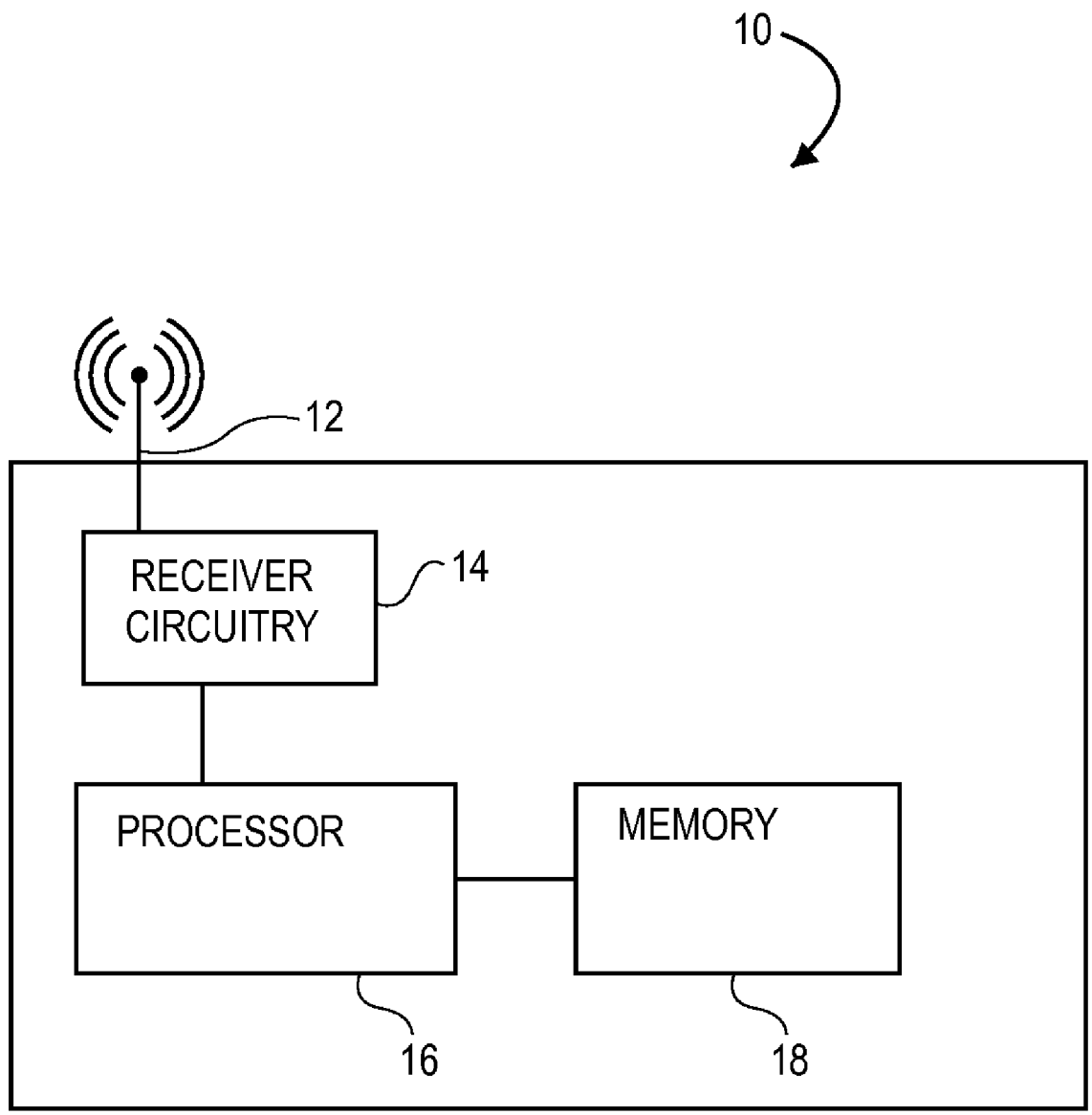
FIG. 1 is a schematic diagram of certain components of an exemplary receiver operable to estimate a symbol rate of a received signal according to principles of the present invention.

A receiver operable to estimate a symbol rate of a received signal according to principles of the present teachings is illustrated in FIG. 1 and designated generally by the reference numeral 10. The receiver 10 comprises an antenna 12, receiver circuitry 14, a processor 16, and a memory component 18. The receiver 10 may further include other conventional components not illustrated or described herein, such as, for example, a power supply and user interface elements.

The receiver circuitry 14 is operable to detect signals collected by the antenna 12 and condition the signals to be analyzed by the processor 16. The receiver circuitry 14 may convert signals received via the antenna 12 to digital format, generating a series of digital sample values representing the received signal. The receiver circuitry 14 may include circuitry adapted specifically for use with one or more particular encoding schemes. For example, it is common in quadrature phase shift keying to separate an in-phase component from a quadrature component of a received signal. Such circuitry is known in the art and therefore will not be discussed in detail.

The processor 16 controls, at least in part, operation of the receiver 10. The processor 16 is preferably a digital integrated circuit and may be a general use, commercial off-the-shelf computer processor. Alternatively, the processor 16 may be a programmable logic device configured for operation with the receiver 10, or may be an application specific integrated circuit (ASIC) especially manufactured for use in the receiver 10. While illustrated as a single component of the block diagram, the processor 16 may include two or more separate integrated circuits working in cooperation to control operation of the receiver 10, and may include one or more analog elements operating in concert with or in addition to the digital circuit or circuits. The processor 16 may also be referred to herein as a "computer," wherein "computer" includes any data processing device including, but not limited to, a computer processor microchip and a computing system, such as a computer workstation. The memory component 18 stores data, instructions, or both used by the processor 16. While the memory component 18 is illustrated as a single unit separate from the processor 16, the memory component 18 may be internal to the processor 16 or may include multiple units.

The receiver 10 includes a computer program stored in the memory component 18 and operable to enabling the processor 16 to estimate a symbol rate of a signal received via the antenna 12 and the receiver circuitry 14. A signal "symbol" is a unique state of the symbol according to a modulation scheme conveying one or more information bits to the receiver. The present invention is useful to estimate a symbol rate of a signal regardless of the internal structure of the signal, including the modulation scheme used to encode data in the signal. For example, the present invention is useful with frequency shift keying, on/off keying, amplitude modulation, and phase shift keying. Embodiments of the invention are hereafter illustrated and described for use with signals encoded according to a phase shift key modulation scheme. Those skilled in the art, however, will understand that the system and method described herein is equally useful with other encoding schemes, and that modifying the present teachings for use with other encoding schemes is well within the ordinary level of skill of this art.

Figure 2:
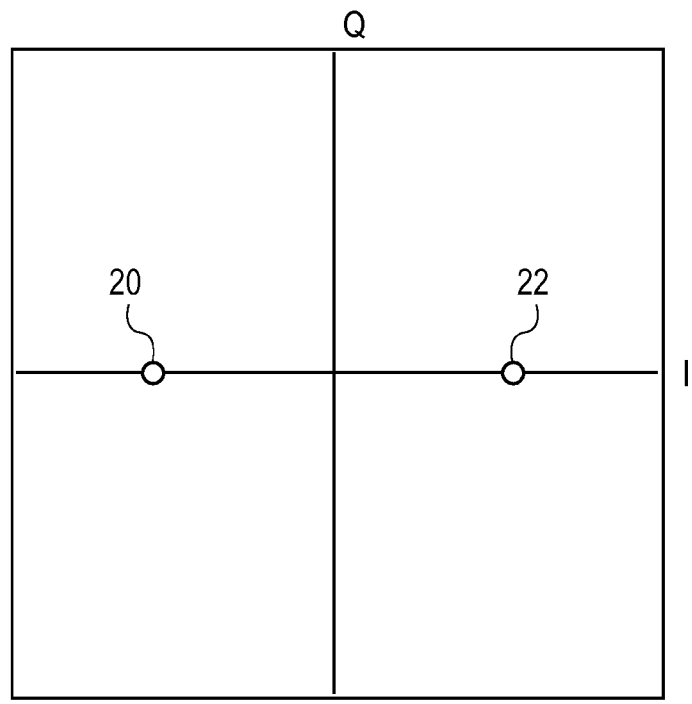
FIG. 2 illustrates exemplary locations of binary phase shift key symbols in the complex plane.

The simplest form of phase shift keying is binary phase shift keying (BPSK). In BPSK, the carrier signal may present one of two phases that are separated by 180°. This scenario is illustrated in the constellation diagram of FIG. 2, wherein a first phase is illustrated as a first symbol 20 in the I/Q (in-phase/quadrature) plane and a second phase is illustrated as a second symbol 22 in the I/Q plane. BPSK is less susceptible to errors than other forms of phase shift keying due to the 180° of separation between symbols, but communicates only one bit per symbol.

Figure 3:
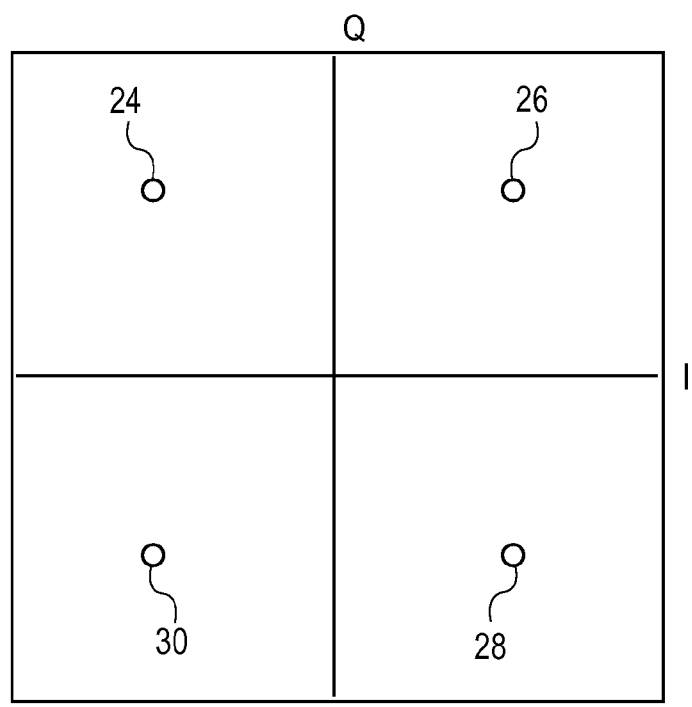
FIG. 3 illustrates exemplary locations of quadrature phase shift key symbols in the complex plane.

Another form of phase shift keying is quadrature phase shift keying (QPSK). In QPSK, the carrier signal may present one of four possible phases, as illustrated in the constellation diagram of FIG. 3. A first phase is illustrated as a first symbol 24 in the I/Q plane, a second phase is illustrated as a second symbol 26, a third phase is illustrated as a third symbol 28, and a fourth phase is illustrated as a fourth symbol 30. In the QPSK encoding scheme, each symbol is separated by 90°, therefore QPSK is more susceptible to errors than BPSK. However, each symbol in QPSK represents two bits of data, therefore QPSK presents a higher baud rate than BPSK at the same symbol frequency. The present teachings are equally applicable to phase shift key encoding schemes other than those described above including, for example, encoding schemes with eight symbols.

Figure 4:
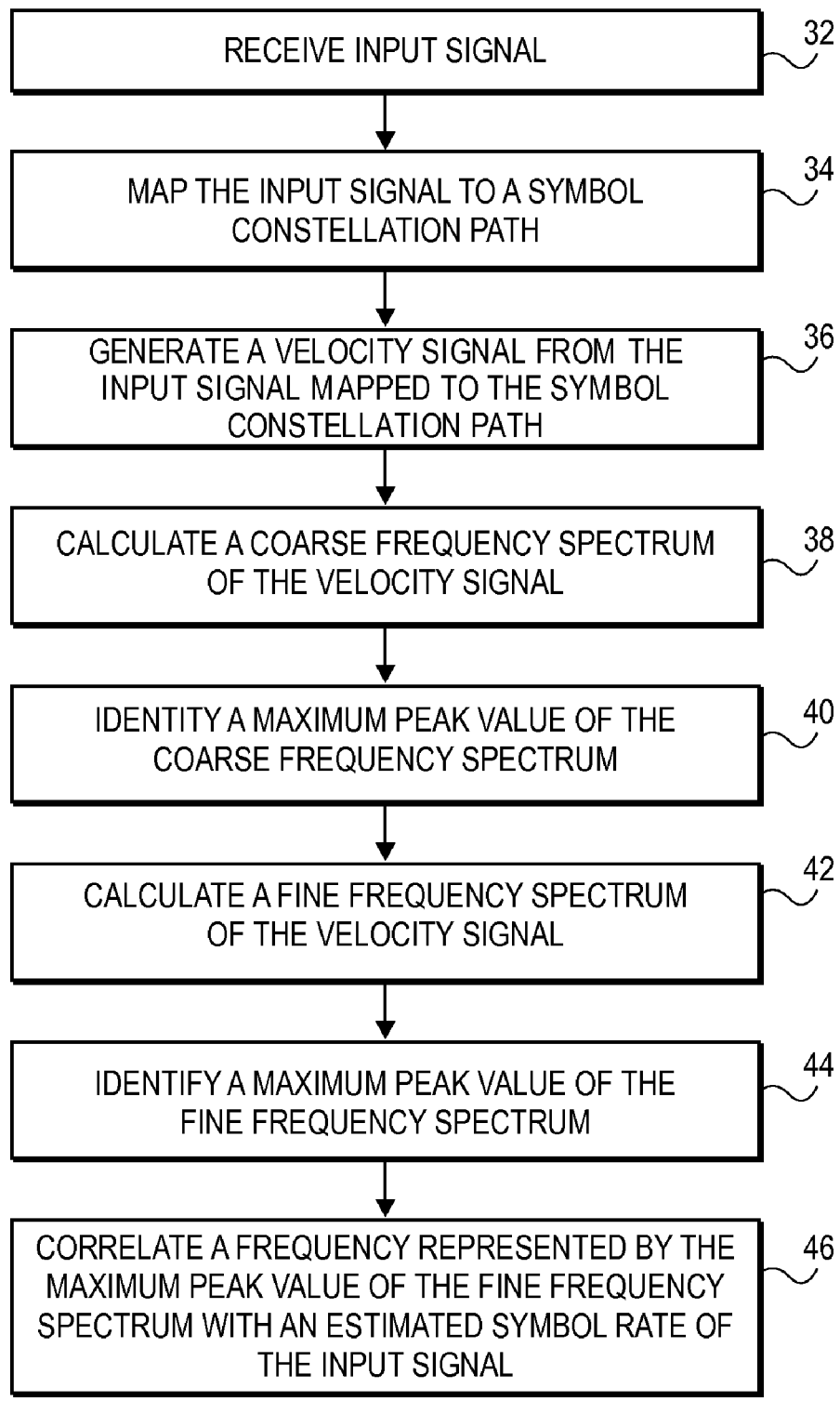
FIG. 4 is a flow diagram of exemplary steps involved in the system and method of symbol rate estimation of the present invention.

The flow chart of FIG. 4 illustrates certain steps involved in a method of estimating a symbol rate of the signal according to principles of the present invention. The symbol rate is the frequency at which symbols are communicated from a transmitter to a receiver on the carrier signal. Some of the blocks of the flow chart may represent a module segment or portion of code of a computer program which comprises one or more executable instructions for implementing the specified logical function or functions. In some alternative implementations, the functions noted in the various blocks may occur out of the order depicted. For example, two blocks shown in succession may in fact be executed substantially concurrently, or the blocks may sometimes be executed in reverse order depending upon the functionality involved.

An input signal is received, as depicted in box 32, and the input signal is mapped to a symbol constellation path, as depicted in block 34. Mapping the input signal to a symbol constellation path may involve, for example, mapping each sample value of the input signal to the complex plane. If the QPSK input signal is thought of as a combination of a sine wave and a cosine wave, each presenting one of two phases, the value along the in-phase axis varies with the amplitude of the sine wave, and the value along the quadrature axis varies with the amplitude of the cosine wave. Thus, the input signal samples form a path in the complex plane that travels between the four symbols of the constellation.

Figure 5:
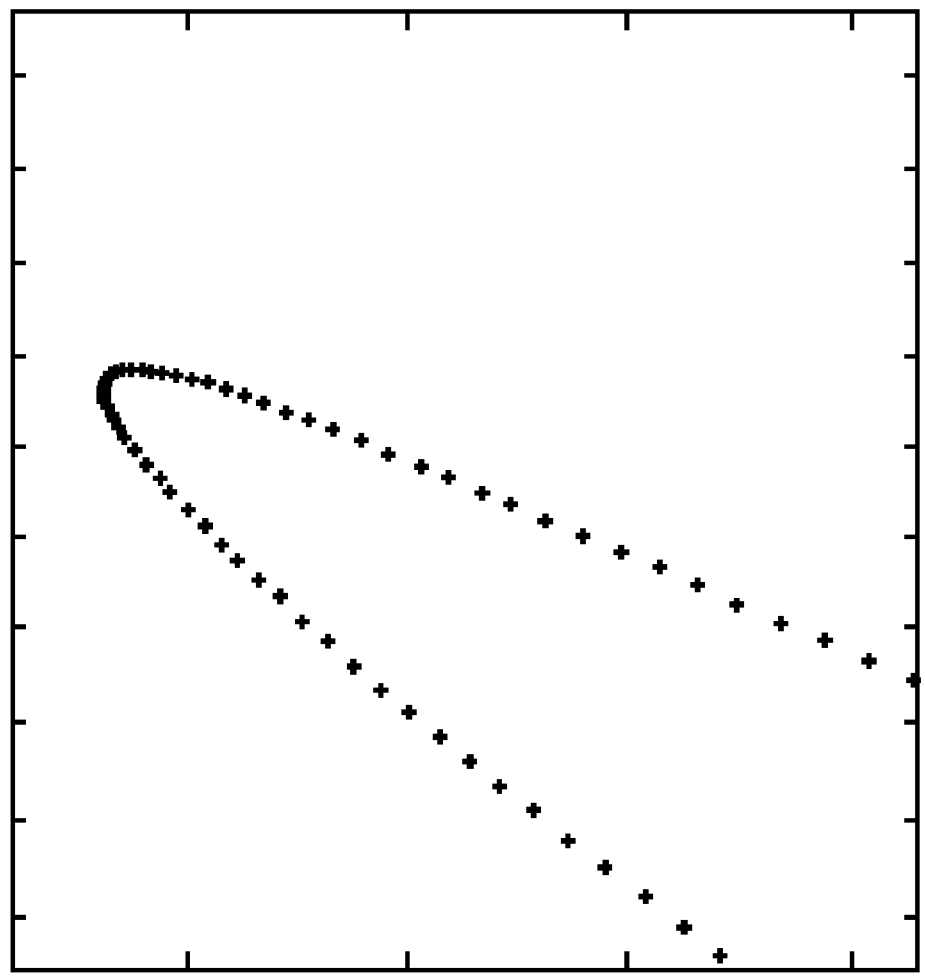
FIG. 5 is a graph presenting a plot of a portion of a symbol constellation path, wherein the path comprises a series of samples mapped to the symbol constellation from an input signal.

An exemplary plot illustrating a plurality of input signal samples mapped to a symbol constellation path is presented in FIG. 5. The plot of FIG. 5 represents the upper left quadrant of the I/Q coordinate system of FIG. 3, wherein the symbol constellation path samples approach and cross a point in the I/Q plane corresponding to the symbol 24, and then depart from the point toward another symbol in the constellation.

Figure 6:
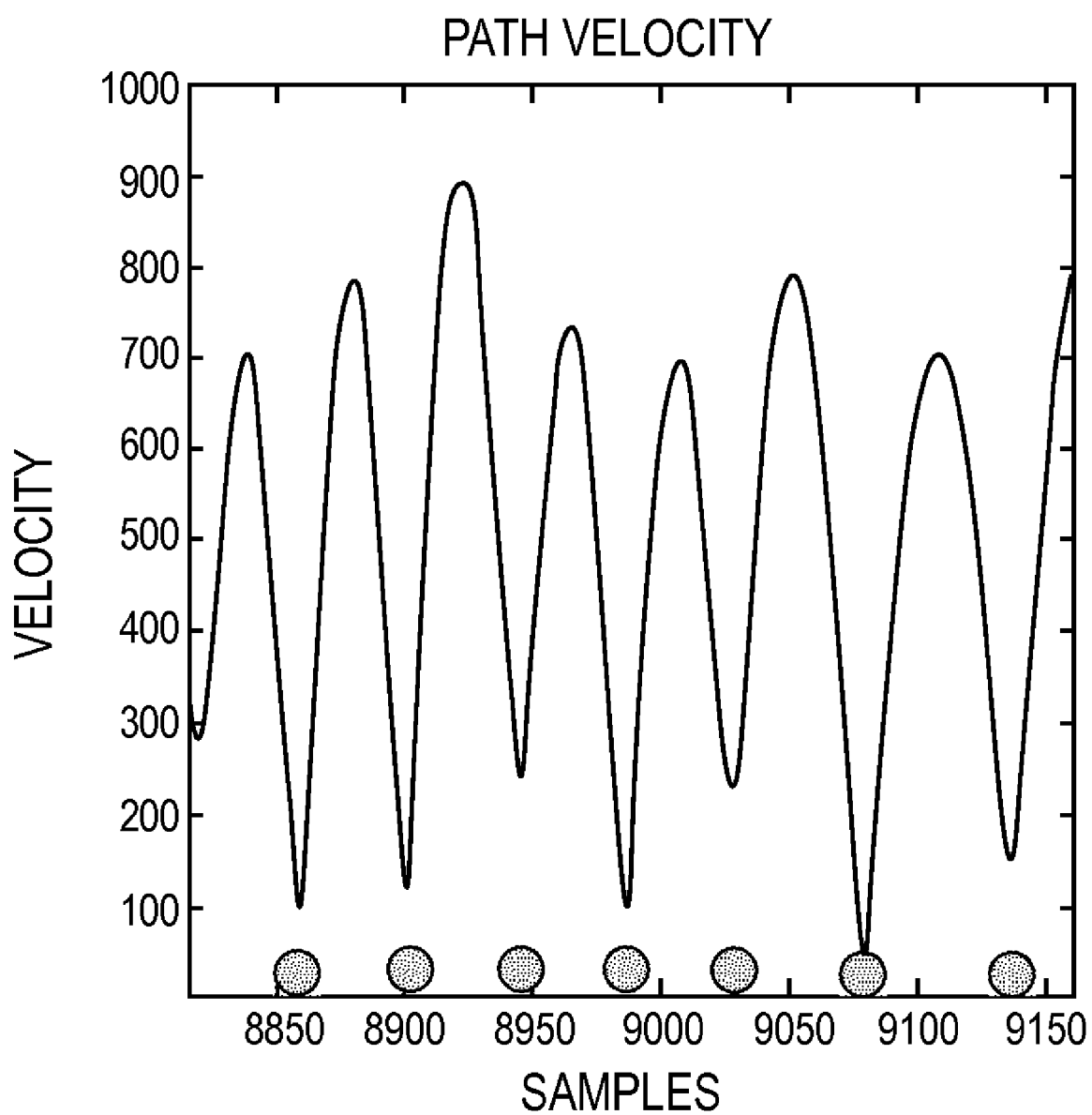
FIG. 6 is a graph of a velocity signal representing a velocity of a signal comprising the constellation path samples of FIG. 5.

A velocity signal is then generated from the symbol constellation path generated from the input signal, as depicted in block 36. This may involve determining a derivative with respect to time of the signal mapped to the symbol constellation path. A separation between points on the constellation path may be calculated, for example, wherein a decrease in the separation indicates a decrease in velocity and an increase in the separation indicates an increase in velocity. Considering the graph of FIG. 5, the points become closer together as they approach the upper left of the graph and increase in separation as they approach the lower right of the graph. The separation approaches or reaches zero at the center of each symbol, or, in other words, the velocity of the signal on the constellation path approaches or reaches zero at the center of each symbol. This is illustrated in the graph of the velocity signal of FIG. 6, where the plotted velocity signal reaches a minimum near each symbol center.

The velocity signal can provide some indication of the symbol frequency in that a distance between symbol centers is roughly indicated by the distance between minimum points in the graph. Symbol rate estimation from the velocity graph alone is subject to error, however, because the points comprising the symbol constellation path rarely fall directly on top of an actual signal center, and a distance between a sample a set of samples may be subject to error. Therefore, the present invention contemplates a more accurate symbol rate estimation involving spectrum analysis.

A coarse frequency spectrum of the velocity signal is calculated, as depicted in block 38. This may involve using a Fourier transform, such as the Fast Fourier transform or other discrete Fourier transform, to generate a frequency spectrum presenting a first frequency band. The first frequency band is sufficiently broad to include all possible fundamental frequencies of the velocity signal so that the fundamental frequency can be roughly estimated. Any of various algorithms may be used to generate the coarse frequency spectrum, including the Hadamard transform or a Wavelet transform.

Figure 7:
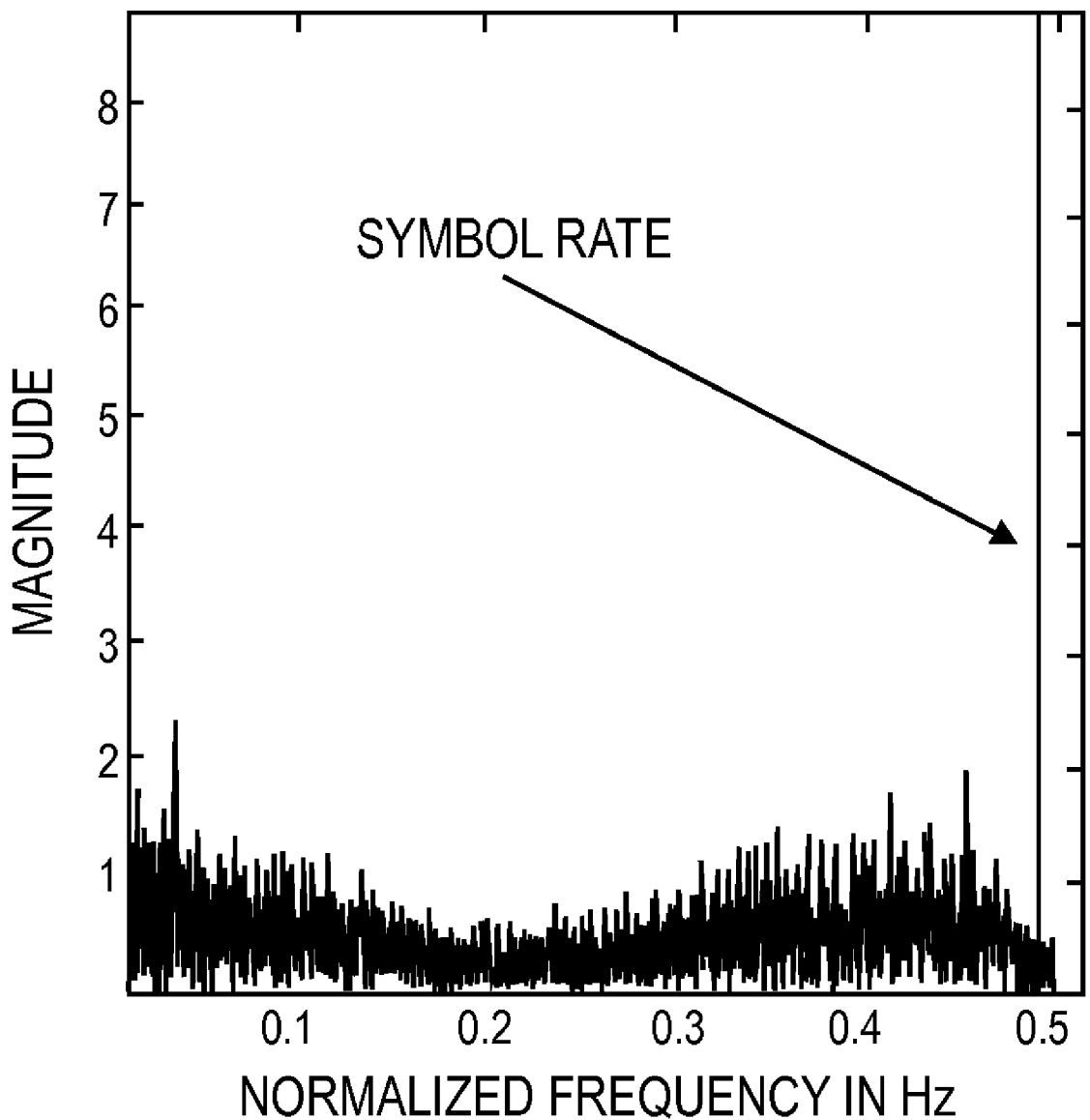
FIG. 7 is a coarse frequency spectrum of the velocity signal of FIG. 6.

Once the coarse frequency spectrum is generated, a maximum peak value of the spectrum is identified, as depicted in block 40. The maximum peak value represents the fundamental frequency of the velocity signal and thus the estimated symbol rate. A coarse frequency spectrum is illustrated in FIG. 7, wherein the maximum peak value corresponds to a frequency of slightly less than 0.5 Hz.

A fine frequency spectrum of the velocity signal is then generated, as depicted in block 42, wherein the fine frequency spectrum includes a narrower band of frequencies and a higher resolution than the coarse frequency spectrum. This step may involve performing a Chirp-Z transform on the velocity signal focused on a range of frequencies including the maximum peak frequency of the coarse frequency spectrum. The Chirp-Z transform is performed on the velocity signal with lower and upper frequencies as parameters defining a range of output frequencies, wherein the range of output frequencies includes the maximum peak value of the coarse frequency spectrum.

Figure 8:
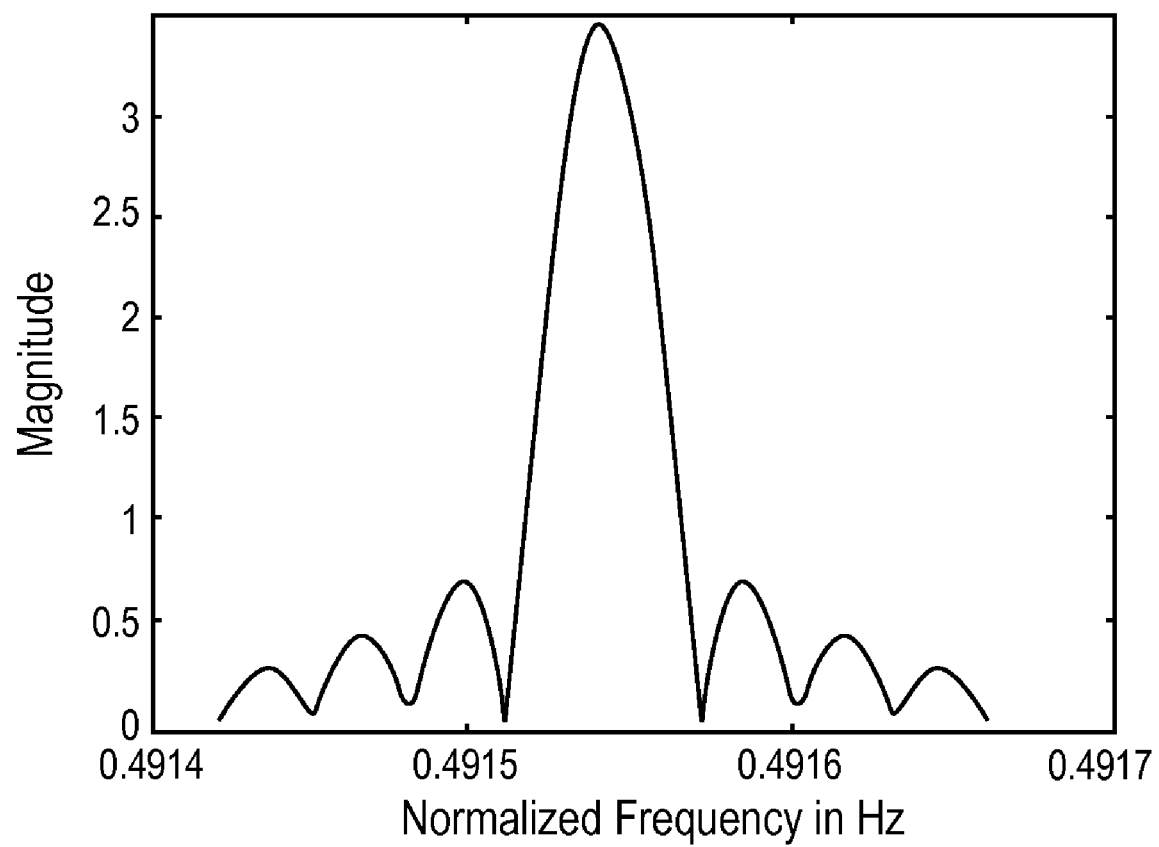
FIG. 8 is a fine frequency spectrum of the velocity signal of FIG. 6.

The range of frequencies is preferably within about twenty bins below the maximum peak frequency to about twenty bins above the maximum peak frequency; more preferably within about ten bins below the maximum peak frequency to about ten bins above the maximum peak frequency; even more preferably within about five bins below the maximum peak frequency to about five bins above the maximum peak frequency; and most preferably from about one bin below the maximum peak frequency to about one bin above the maximum peak frequency. An exemplary fine frequency spectrum is illustrated in FIG. 8, wherein the maximum peak value corresponds to a frequency failing between 0.4915 Hz and 0.4916 Hz.

A frequency represented by the maximum peak value of the fine frequency spectrum is then correlated with an estimated symbol rate of the input signal, as depicted in block 46 of FIG. 4. In the example set forth above, the frequency correlated with the estimated symbol rate of the input signal may be 0.49155 Hz. The estimated symbol rate of the input signal may then be used, for example, to further analyze the structure and/or the content of the input signal.

The above-described method of generating a coarse frequency spectrum followed by a fine frequency spectrum "zoomed-in" on the fundamental frequency of the coarse frequency spectrum is both efficient and highly accurate. The coarse frequency spectrum requires relatively little time to generate and provides a rough estimate of the fundamental frequency of the velocity signal. The rough estimate of the fundamental frequency is then used to focus the more rigorous calculations associated with generating the fine frequency spectrum, thus reducing the time required to generate a high-resolution frequency spectrum and identify the fundamental frequency of the velocity signal with greater accuracy. It will be appreciated that in some situations, a symbol rate estimate of limited accuracy may be sufficient, in which case the method may involve generating only the coarse frequency spectrum and correlating the symbol rate with the fundamental frequency indicated in the coarse frequency spectrum.

Figure 9:
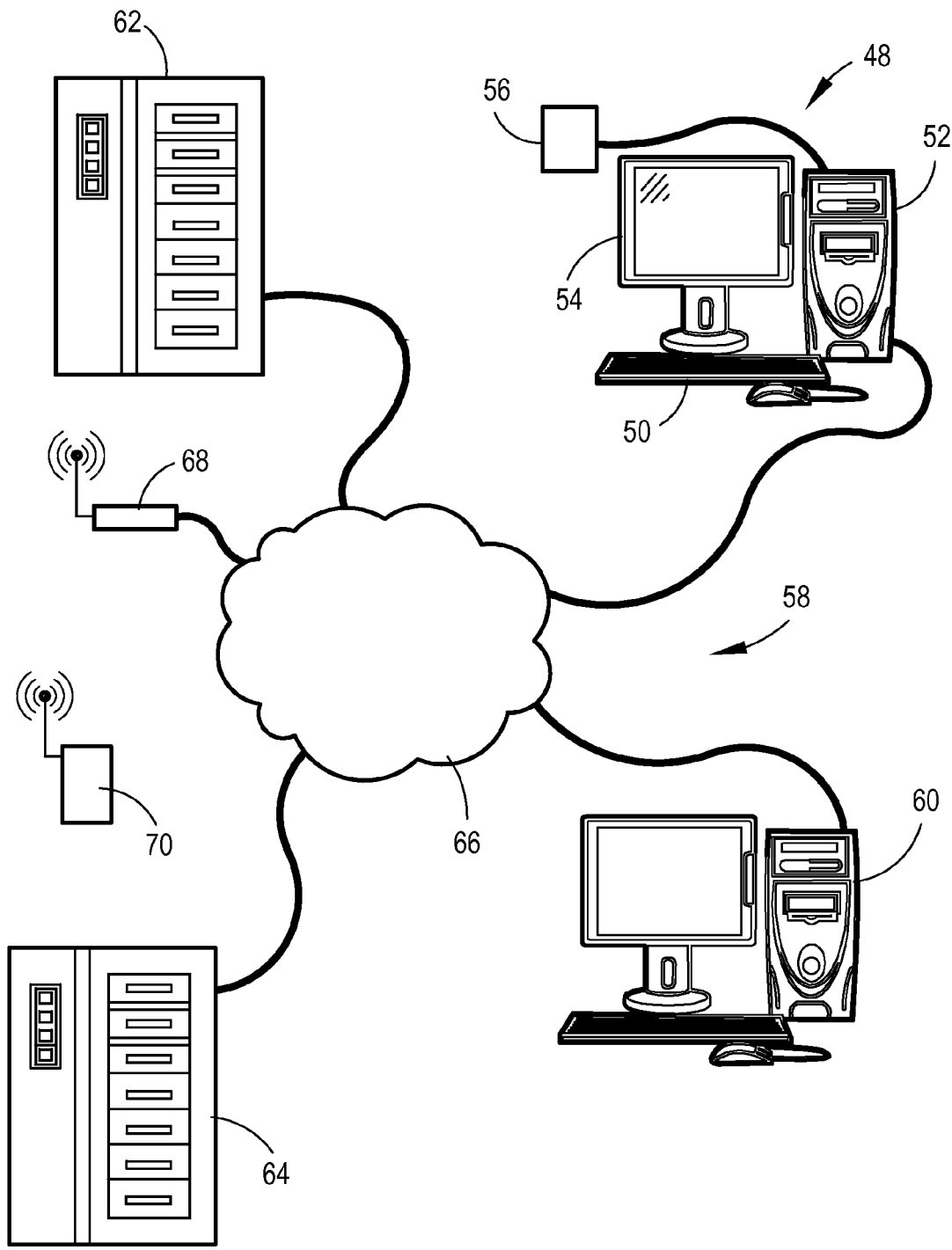
FIG. 9 is a schematic diagram of an exemplary computer system operable to implement a computer program for estimating a symbol rate of a signal according to principles of the present invention.

In a second embodiment, the invention is implemented in a computer program executed by a computer workstation or computer network, such as the computer 48 of FIG. 9 that includes a keyboard 50, a processor console 52, a display 54, and one or more peripheral devices 56, such as a scanner or printer. The computer 48 may be a part of a computer network, such as the computer network 58 that includes one or more client computers 48,60 and one or more server computers 62,64 interconnected via a communications system 66. The present invention may also be implemented, in whole or in part, on a wireless communications system including, for example, a network-based wireless transmitter 68 and one or more wireless receiving devices, such as a hand-held computing device 70 with wireless communication capabilities.

In this embodiment, the signal to be analyzed may be received via a receiver, such as the receiver 10 of FIG. 1 or a conventional receiver, via the computer peripheral device 56, or via another means. The received signal may be digitized by a receiving device or by the computer 48, and may be stored in a mass storage device associated with the computer 48.

The computer program of the second embodiment of the present invention is stored in or on a computer-usable medium, such as a computer-readable medium, residing on or accessible by a host computer for instructing the host computer to implement the method of the present invention as described herein. The host computer may be a server computer, such as server computer 62, or a network client computer, such as computer 48. The computer program preferably comprises an ordered listing of executable instructions for implementing logical functions in the host computer and other computing devices coupled with the host computer. The computer program can be embodied in any computer-usable medium for use by or in connection with an instruction execution system, apparatus, or device, such as a computer-based system, processor-containing system, or other system that can fetch the instructions from the instruction execution system, apparatus, or device, and execute the instructions.

The ordered listing of executable instructions comprising the computer program of the present invention will hereinafter be referred to simply as "the program" or "the computer program." It will be understood by those skilled in the art that the program may comprise a single list of executable instructions or two or more separate lists, and may be stored on a single computer-usable medium or multiple distinct media. The program will also be described as comprising various "code segments," which may include one or more lists, or portions of lists, of executable instructions. Code segments may include overlapping lists of executable instructions, that is, a first code segment may include instruction lists A and B, and a second code segment may include instruction lists B and C.

In the context of this document, a "computer-usable medium" can be any means that can contain, store, communicate, propagate or transport the program for use by or in connection with the instruction execution system, apparatus, or device. The computer-usable medium can be, for example, but is not limited to, an electronic, magnetic, optical, electromagnetic, infrared, or semi-conductor system, apparatus, device, or propagation medium. More specific, although not inclusive, examples of computer-usable media would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

Furthermore, the combination of computer code segments operable to implement the present invention may be distributed across a computer network. For example, signal acquisition could occur using receivers or computer workstations at multiple locations throughout the nation, and the data could then be communicated to one or more regional sites using a communications network such as the Internet. Computers at the regional site or sites could perform the symbol rate estimation described above and send the results to one or more central computers, such as the network server 62 for further analysis, storage, or both. Copies of the data may be stored in any or all of the computers involved in the distributed process.

Figure 10:
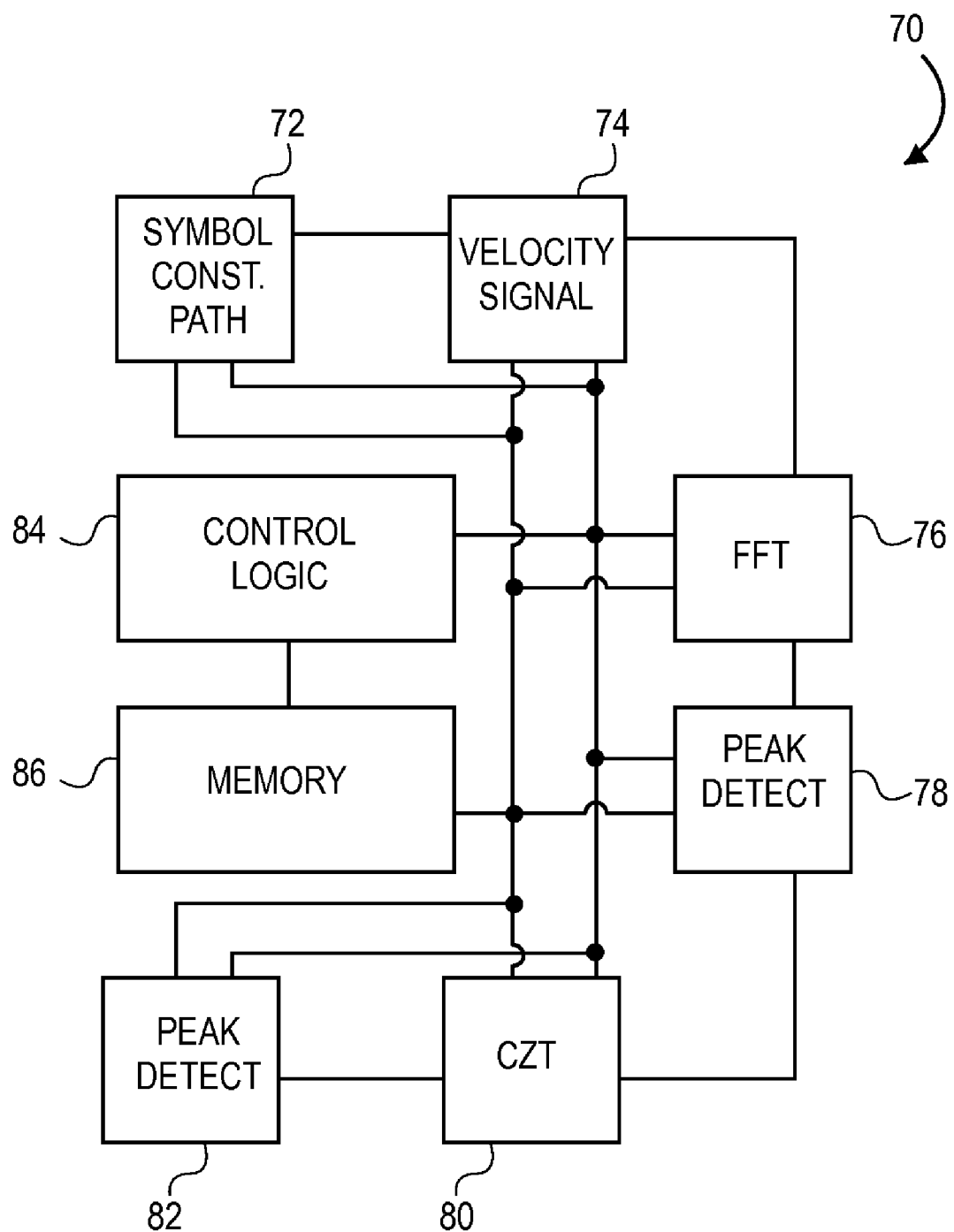
FIG. 10 is a schematic diagram of an exemplary circuit for estimating a symbol rate of a signal according to principles of the present invention.

In a third embodiment, the invention is implemented partially or entirely in hardware, such as application specific integrated circuits or programmable logic devices. Examples of programmable logic devices include field programmable gate arrays and complex programmable logic devices. Referring to FIG. 10, the third embodiment of the invention is a circuit 70 for estimating a symbol rate of a signal. The circuit 70 comprises various circuit elements, including a first circuit element 72 for converting a plurality of input signal sample values to a plurality of symbol constellation path values, and a second circuit element 74 for generating a velocity signal comprising a plurality of velocity values, wherein each velocity value represents a separation between a first of the plurality of symbol constellation path values and a second of the plurality of symbol constellation path values.

A third a circuit element 76 determines a first frequency spectrum of the velocity signal by performing a Fast Fourier transform on the velocity signal, and a fourth circuit element 78 identifies a maximum peak value of the first frequency spectrum, a first bin below the maximum peak value, and a second bin above the maximum peak value. A fifth circuit element 80 performs a Chirp-Z (CZT) transform on the velocity signal using the first bin and the second bin as coefficients, wherein performing the Chirp-Z transform generates a second frequency spectrum including only frequencies within the range of the first bin and the second bin, and wherein the second frequency spectrum presents a higher resolution than the first frequency spectrum. A sixth circuit element 82 identifies a maximum peak value of the second frequency spectrum.

The circuit 70 may also include control logic 84 and a memory component 86 for directing operation of the circuit 70. Alternatively, control logic and memory may be integrated into the various other elements of the circuit 70. Also, while the various circuit elements have been illustrated and described as separate elements, two or more of the circuit elements may be functionally combined into a single element. Furthermore, each circuit element may be implemented in a separate hardware device, such as a microchip, or all of the circuit elements may be combined onto a single hardware device.

Although the invention has been described with reference to the preferred embodiments illustrated in the attached drawings, it is noted that equivalents may be employed and substitutions made herein without departing from the scope of the invention as recited in the claims. It will be appreciated, for example, that a first portion of the method of the invention may be implemented in hardware while a second portion of the invention may be implemented in software, whether in a receiver, a handheld device, or a computer workstation.

Having thus described a preferred embodiment of the invention, what is claimed as new and desired to be protected by Letters Patent includes the following:

1. A non-transitory computer-usable medium with an executable program stored thereon for enabling a computer to estimate a symbol rate of a signal, the computer-usable medium including a computer program comprising:

a code segment for mapping sampled points of an input signal to a symbol constellation path;

a code segment for calculating a separation between points that are mapped on the symbol constellation path;

a code segment for generating a velocity signal corresponding to the separation between points on the symbol constellation path, wherein a decrease in the separation indicates a decrease in velocity and an increase in the separation indicates an increase in velocity;

a code segment for determining a frequency spectrum of the velocity signal; and a code segment for identifying a maximum peak value of the frequency spectrum.

2. The computer-usable medium as set forth in claim 1, further comprising:

a code segment for determining a first frequency spectrum of the velocity signal;

a code segment for identifying a maximum peak value of the first frequency spectrum;

a code segment for determining a second frequency spectrum of the velocity signal, wherein the second frequency spectrum includes the maximum peak value of the first frequency spectrum, presents a higher resolution than the first frequency spectrum, and presents a narrower frequency band than the first frequency spectrum;

a code segment for identifying a maximum peak value of the second frequency spectrum; and a code segment for correlating a frequency represented by the maximum peak value of the second frequency spectrum with an estimated symbol rate of the input signal.

3. The computer-usable medium as set forth in claim 2, wherein the second frequency spectrum presents a frequency band within the range of about twenty bins below the maximum peak value of the first frequency spectrum to about twenty bins above the maximum peak value of the first frequency spectrum.

4. The computer-usable medium as set forth in claim 2, wherein the second frequency spectrum presents a frequency band within the range of about ten bins below the maximum peak value of the first frequency spectrum to about ten bins above the maximum peak value of the first frequency spectrum.

5. The computer-usable medium as set forth in claim 2, wherein the second frequency spectrum presents a frequency band within the range of about five bins below the maximum peak value of the first frequency spectrum to about five bins above the maximum peak value of the first frequency spectrum.

6. The computer-usable medium as set forth in claim 2, wherein the second frequency spectrum presents a frequency band within the range of about one bin below the maximum peak value of the first frequency spectrum to about one bin above the maximum peak value of the first frequency spectrum.

7. The computer-usable medium as set forth in claim 2, wherein the code segment for determining the first frequency spectrum performs an algorithm on the velocity signal chosen from the group consisting of a Fast Fourier transform, a Hadamard transform, and a Wavelet transform.

8. The computer-usable medium as set forth in claim 2, wherein the code segment for determining the second frequency spectrum performs a Chirp-Z transform on the velocity signal.

9. The computer-usable medium as set forth in claim 1, further comprising a code segment for correlating a frequency represented by the maximum peak value of the frequency spectrum with a symbol rate of the input signal.

10. A non-transitory computer-usable medium with an executable program stored thereon for enabling a computer to estimate a symbol rate of a signal, the computer-usable medium including a computer program comprising:

a code segment for converting a plurality of input signal sample values to a plurality of symbol constellation path values;

a code segment for generating a velocity signal comprising a plurality of velocity values, wherein each velocity value represents a separation between corresponding consecutive symbol constellation path values and wherein a decrease in the separation indicates a decrease in velocity and an increase in the separation indicates an increase in velocity;

a code segment for determining a first frequency spectrum of the velocity signal by performing a Fast Fourier transform on the velocity signal;

a code segment for identifying a maximum peak value of the first frequency spectrum, a first bin below the maximum peak value, and a second bin above the maximum peak value;

a code segment for performing a Chirp-Z transform on the velocity signal using the first bin and the second bin as coefficients, wherein performing the Chirp-Z transform generates a second frequency spectrum including only frequencies within the range of the first bin and the second bin, and wherein the second frequency spectrum presents a higher resolution than the first frequency spectrum; and a code segment for identifying a maximum peak value of the second frequency spectrum.

11. The computer-usable medium as set forth in claim 10, wherein the first bin is within about twenty bins below the maximum peak value of the first frequency spectrum and the second bin is within about twenty bins above the maximum peak value of the first frequency spectrum.

12. The computer-usable medium as set forth in claim 10, wherein the first bin is within about ten bins below the maximum peak value of the first frequency spectrum and the second bin is within about ten bins above the maximum peak value of the first frequency spectrum.

13. The computer-usable medium as set forth in claim 10, wherein the first bin is within about five bins below the maximum peak value of the first frequency spectrum and the second bin is within about five bins above the maximum peak value of the first frequency spectrum.

14. The computer-usable medium as set forth in claim 10, wherein the first bin is the first bin below the maximum peak value of the first frequency spectrum and the second bin is the first bin above the maximum peak value of the first frequency spectrum.

15. The computer-usable medium as set forth in claim 10, further comprising a code segment for correlating a frequency represented by the maximum peak value of the second frequency spectrum with an estimated symbol rate of the input signal.

16. A method of estimating a symbol rate of a signal, the method comprising:

receiving the signal with a receiving circuit coupled to an antenna;

mapping, using a processor, sampled points of the input signal to a symbol constellation path;

calculating, using the processor, a separation between consecutive points that are mapped on the symbol constellation path;

generating, using the processor, a velocity signal corresponding to the separation between consecutive points on the symbol constellation path, wherein a decrease in the separation indicates a decrease in velocity and an increase in the separation indicates an increase in velocity;

determining, using the processor, a frequency spectrum of the velocity signal; and identifying, using the processor, a maximum peak value of the frequency spectrum.

17. The method as set forth in claim 16, further comprising:
determining a first frequency spectrum of the velocity signal;

identifying a maximum peak value of the first frequency spectrum;

determining a second frequency spectrum of the velocity signal, wherein the second frequency spectrum includes the maximum peak value of the first frequency spectrum, presents a higher resolution than the first frequency spectrum, and presents a narrower frequency band than the first frequency spectrum;

identifying a maximum peak value of the second frequency spectrum; and correlating a frequency represented by the maximum peak value of the second frequency spectrum with an estimated symbol rate of the input signal.

18. The method as set forth in claim 17, wherein the second frequency spectrum presents a frequency band within the range of about twenty bins below the maximum peak value of the first frequency spectrum to about twenty bins above the maximum peak value of the first frequency spectrum.

19. The method as set forth in claim 17, wherein the second frequency spectrum presents a frequency band within the range of about ten bins below the maximum peak value of the first frequency spectrum to about ten bins above the maximum peak value of the first frequency spectrum.

20. The method as set forth in claim 17, wherein the second frequency spectrum presents a frequency band within the range of about five bins below the maximum peak value of the first frequency spectrum to about five bins above the maximum peak value of the first frequency spectrum.

21. The method as set forth in claim 17, wherein the second frequency spectrum presents a frequency band within the range of about one bin below the maximum peak value of the first frequency spectrum to about one bin above the maximum peak value of the first frequency spectrum.

22. The method as set forth in claim 17, wherein determining the first frequency spectrum includes performing an algorithm on the velocity signal chosen from the group consisting of a Fast Fourier transform, a Hadamard transform, and a Wavelet transform.

23. The method as set forth in claim 17, wherein determining the second frequency spectrum includes performing a Chirp-Z transform on the velocity signal.

24. The method as set forth in claim 16, further comprising correlating a frequency represented by the maximum peak value of the frequency spectrum with a symbol rate of the input signal.

25. A method of estimating a symbol rate of a signal, the method comprising:
receiving the signal with a receiving circuit coupled to an antenna;

converting, using a processor, a plurality of input signal sample values to a plurality of symbol constellation path values;

generating, using the processor, a velocity signal comprising a plurality of velocity values, wherein each velocity value represents a separation between corresponding consecutive symbol constellation path values and wherein a decrease in the separation indicates a decrease in velocity and an increase in the separation indicates an increase in velocity;

determining, using the processor, a first frequency spectrum of the velocity signal by performing a Fast Fourier transform on the velocity signal;

identifying, using the processor, a maximum peak value of the first frequency spectrum, a first bin below the maximum peak value, and a second bin above the maximum peak value;

performing, using the processor, a Chirp-Z transform on the velocity signal using the first bin and the second bin as coefficients, wherein performing the Chirp-Z transform generates a second frequency spectrum including only frequencies within the range of the first bin and the second bin, and wherein the second frequency spectrum presents a higher resolution than the first frequency spectrum; and identifying, using the processor, a maximum peak value of the second frequency spectrum.

26. The method as set forth in claim 25, wherein the first bin is within about twenty bins below the maximum peak value of the first frequency spectrum and the second bin is within about twenty bins above the maximum peak value of the first frequency spectrum.

27. The method as set forth in claim 25, wherein the first bin is within about ten bins below the maximum peak value of the first frequency spectrum and the second bin is within about ten bins above the maximum peak value of the first frequency spectrum.

28. The method as set forth in claim 25, wherein the first bin is within about five bins below the maximum peak value of the first frequency spectrum and the second bin is within about five bins above the maximum peak value of the first frequency spectrum.

29. The method as set forth in claim 25, wherein the first bin is the first bin below the maximum peak value of the first frequency spectrum and the second bin is the first bin above the maximum peak value of the first frequency spectrum.

30. The method as set forth in claim 25, further comprising correlating a frequency represented by the maximum peak value of the second frequency spectrum with an estimated symbol rate of the input signal.

31. A programmable logic device for estimating a symbol rate of a signal, the device comprising:
a programmable logic circuit element for mapping an input signal to a symbol constellation path;

a programmable logic circuit element for generating a velocity signal corresponding to the separation between points on the symbol constellation path, wherein a decrease in the separation indicates a decrease in velocity and an increase in the separation indicates an increase in velocity;

a programmable logic circuit element for determining a frequency spectrum of the velocity signal; and a programmable logic circuit element for identifying a maximum peak value of the frequency spectrum.

32. A programmable logic device for estimating a symbol rate of a signal, the device comprising:
a programmable logic circuit element for converting a plurality of input signal sample values to a plurality of symbol constellation path values;

a programmable logic circuit element for generating a velocity signal comprising a plurality of velocity values, wherein each velocity value represents a separation between corresponding consecutive symbol constellation path values and wherein a decrease in the separation indicates a decrease in velocity and an increase in the separation indicates an increase in velocity;

a programmable logic circuit element for determining a first frequency spectrum of the velocity signal by performing a Fast Fourier transform on the velocity signal;

a programmable logic circuit element for identifying a maximum peak value of the first frequency spectrum, a first bin below the maximum peak value, and a second bin above the maximum peak value;

a programmable logic circuit element for performing a Chirp-Z transform on the velocity signal using the first bin and the second bin as coefficients, wherein performing the Chirp-Z transform generates a second frequency spectrum including only frequencies within the range of the first bin and the second bin, wherein the second frequency spectrum presents a higher resolution than the first frequency spectrum; and a programmable logic circuit element for identifying a maximum peak value of the second frequency spectrum.

* * * * *